T. M. DANIELS & J. C. HOLSCHEMACHER.
LOCK NUT MAKING MACHINE.
APPLICATION FILED MAR. 6, 1915.
1,180,016.
Patented Apr. 18, 1916.
14 SHEETS—SHEET 8.
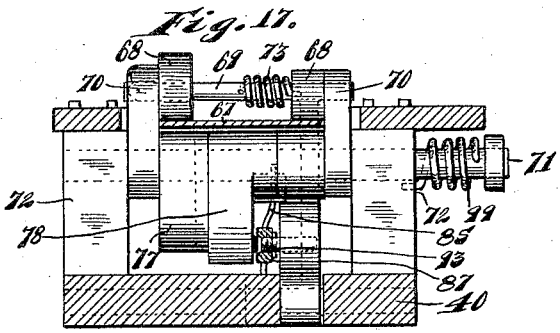
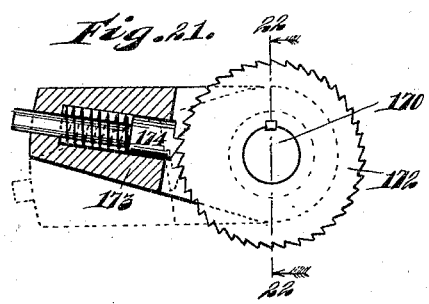
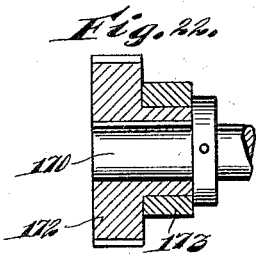
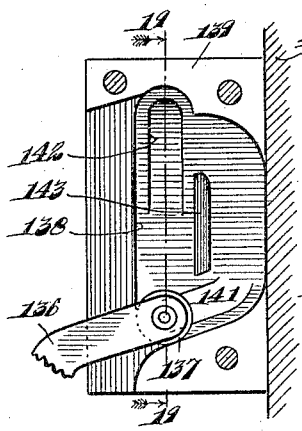
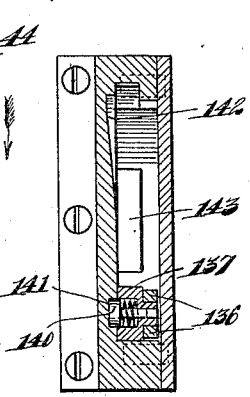
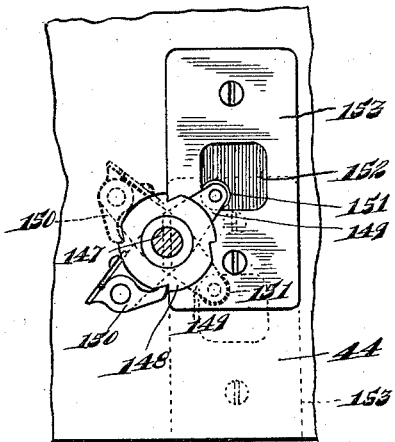

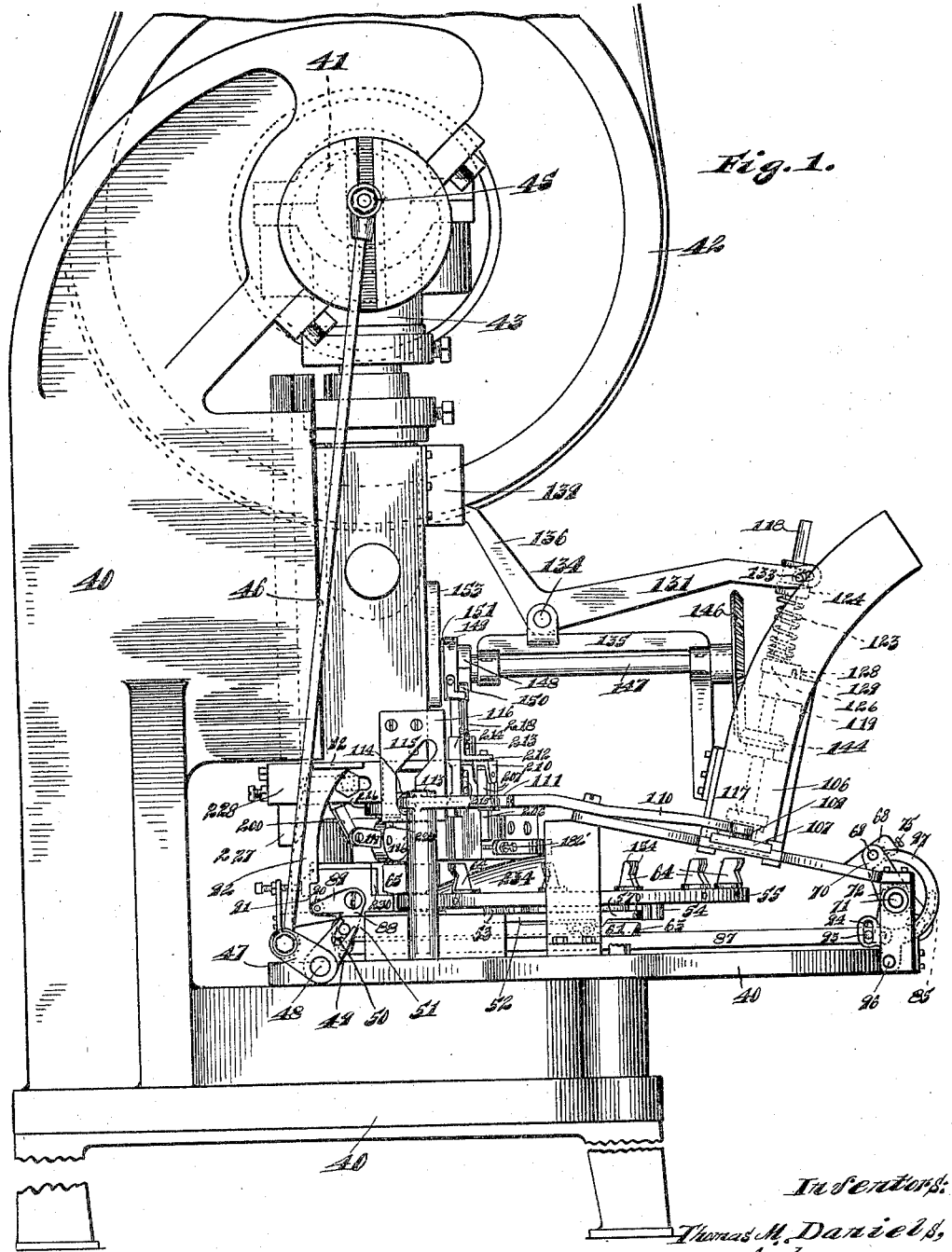

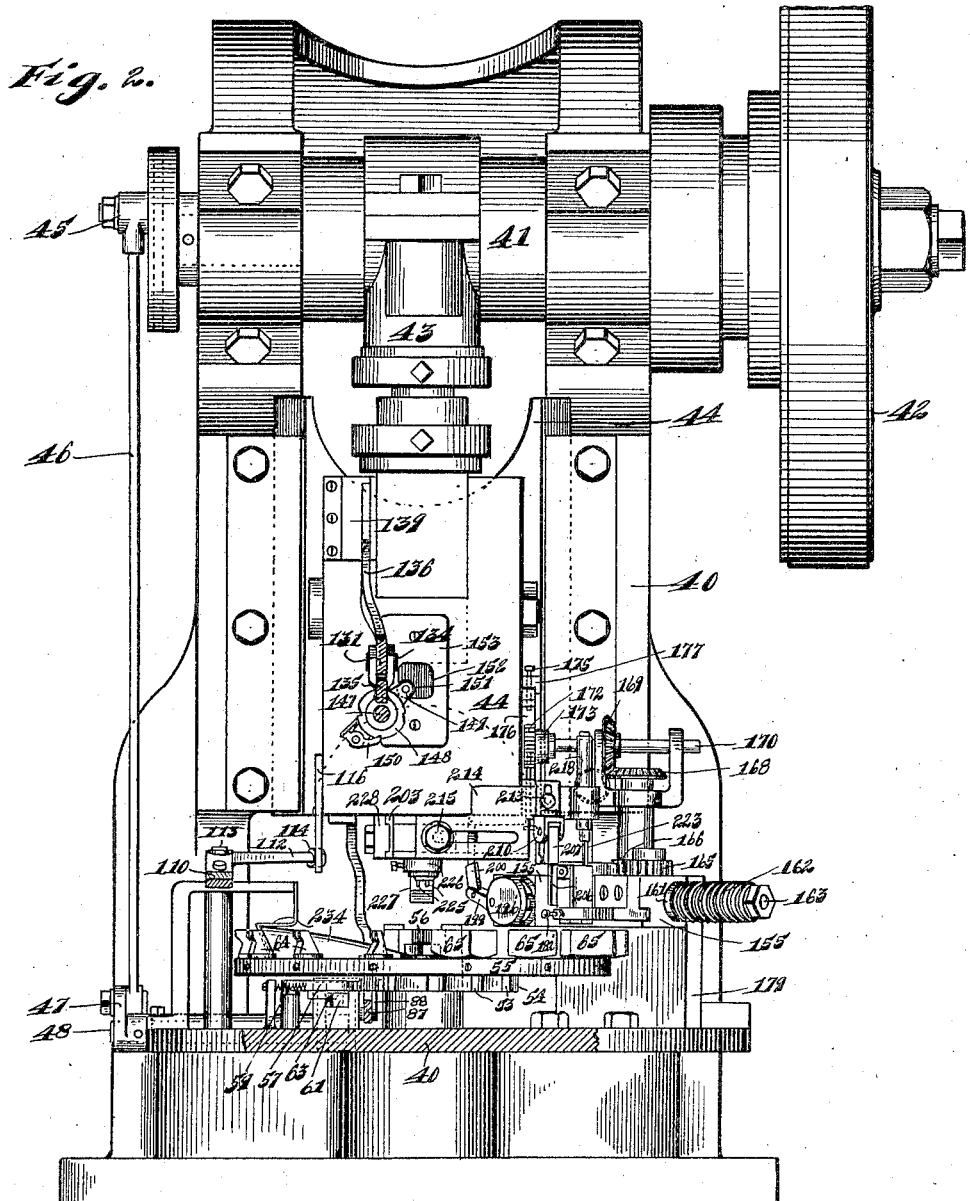

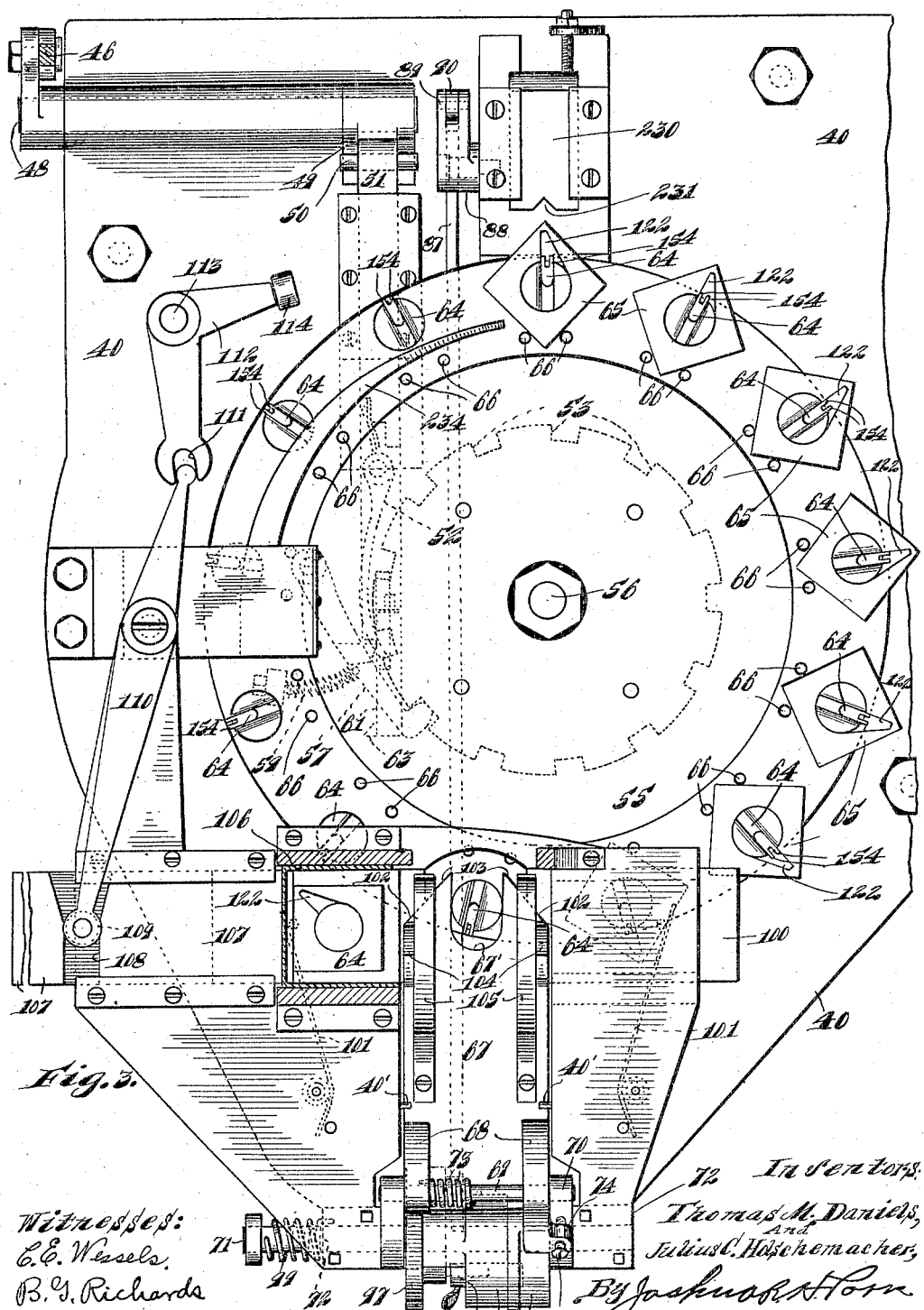

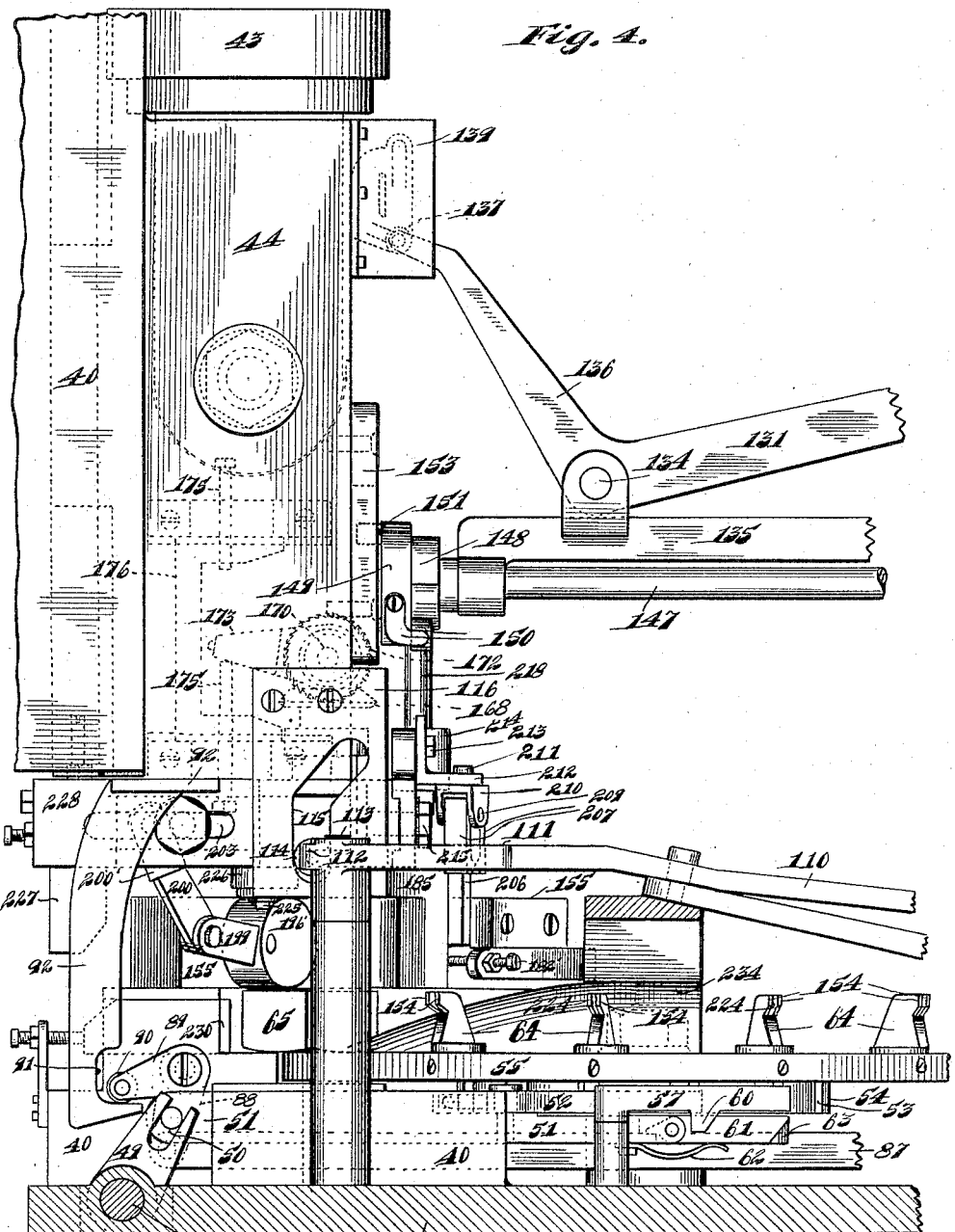

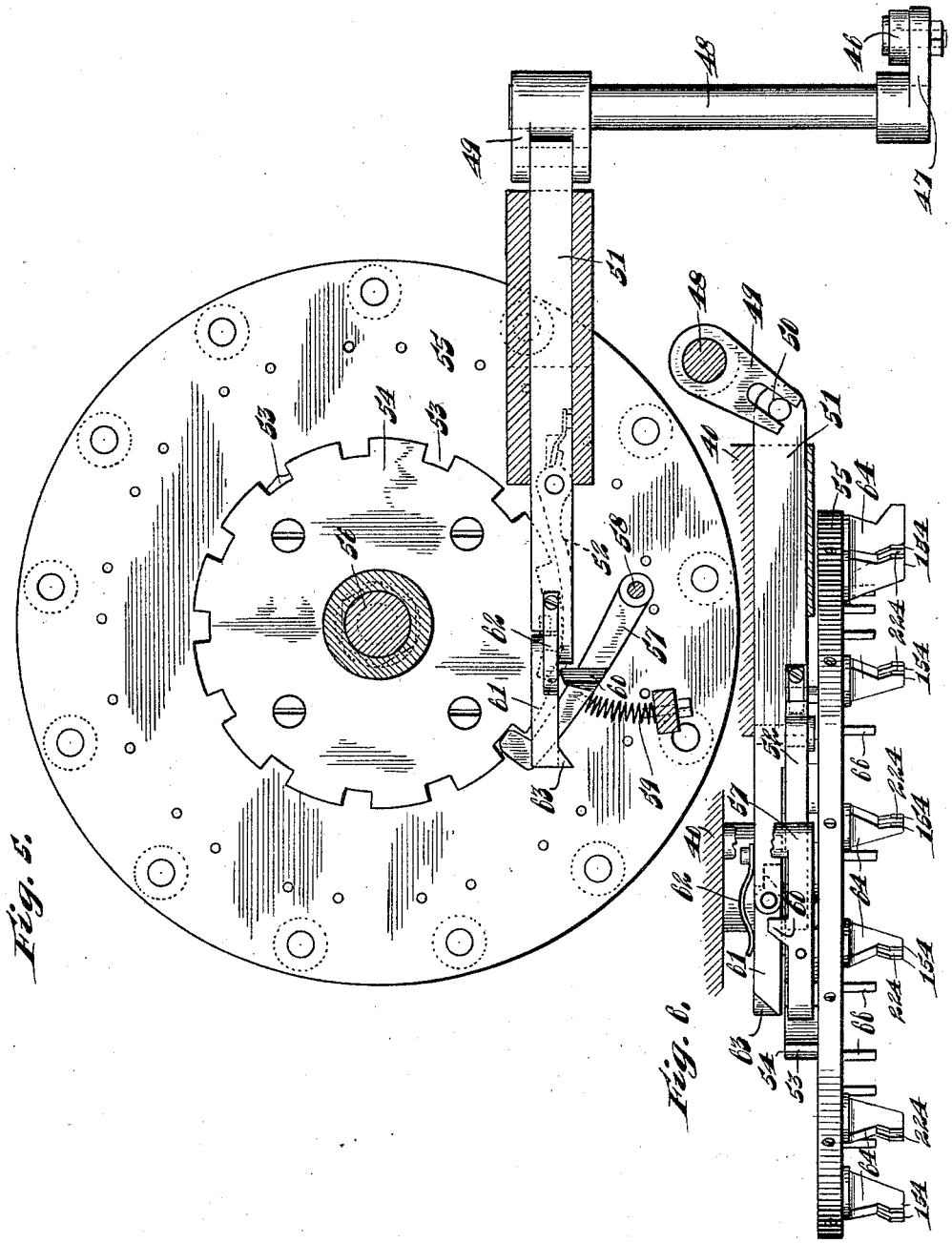

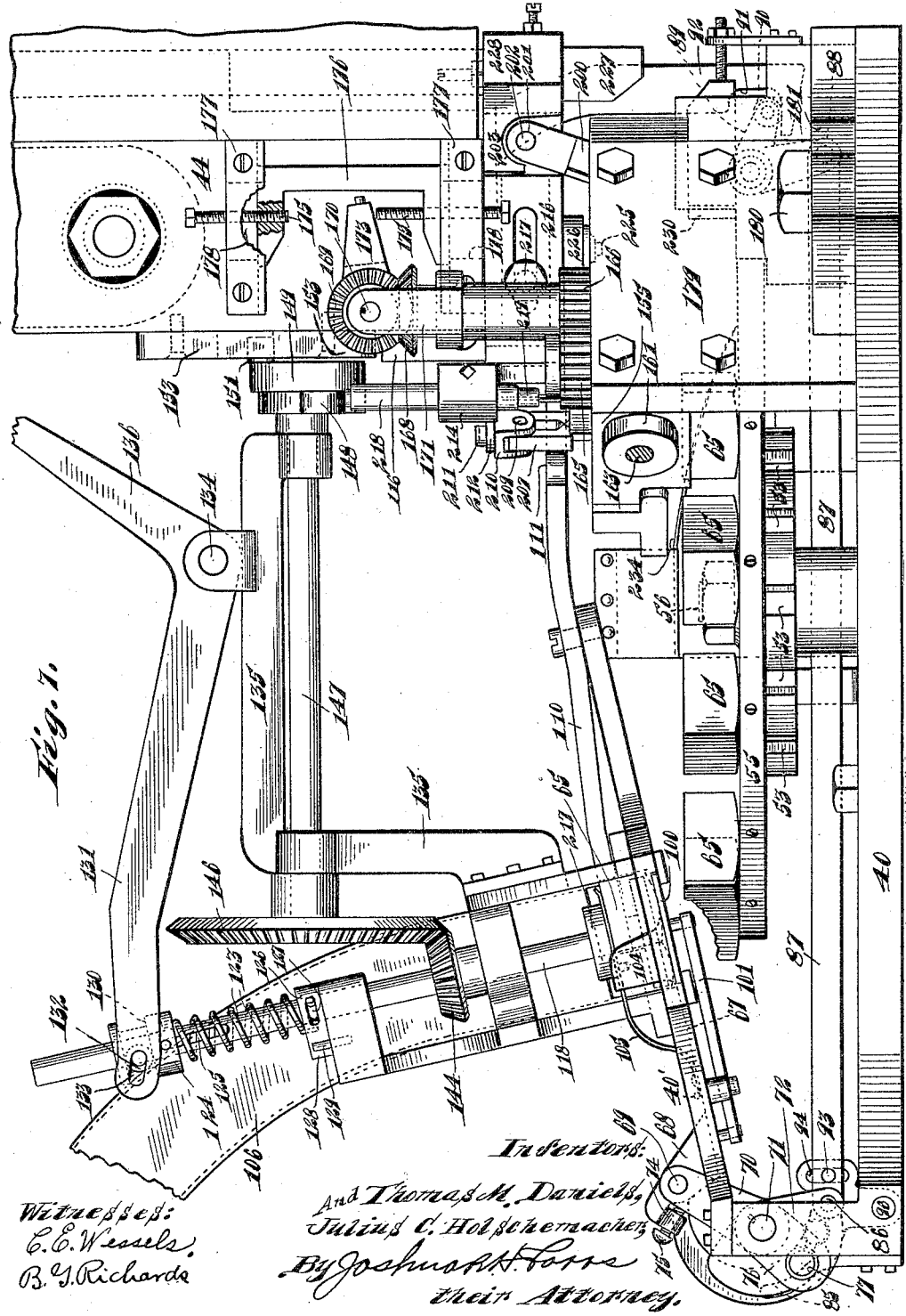

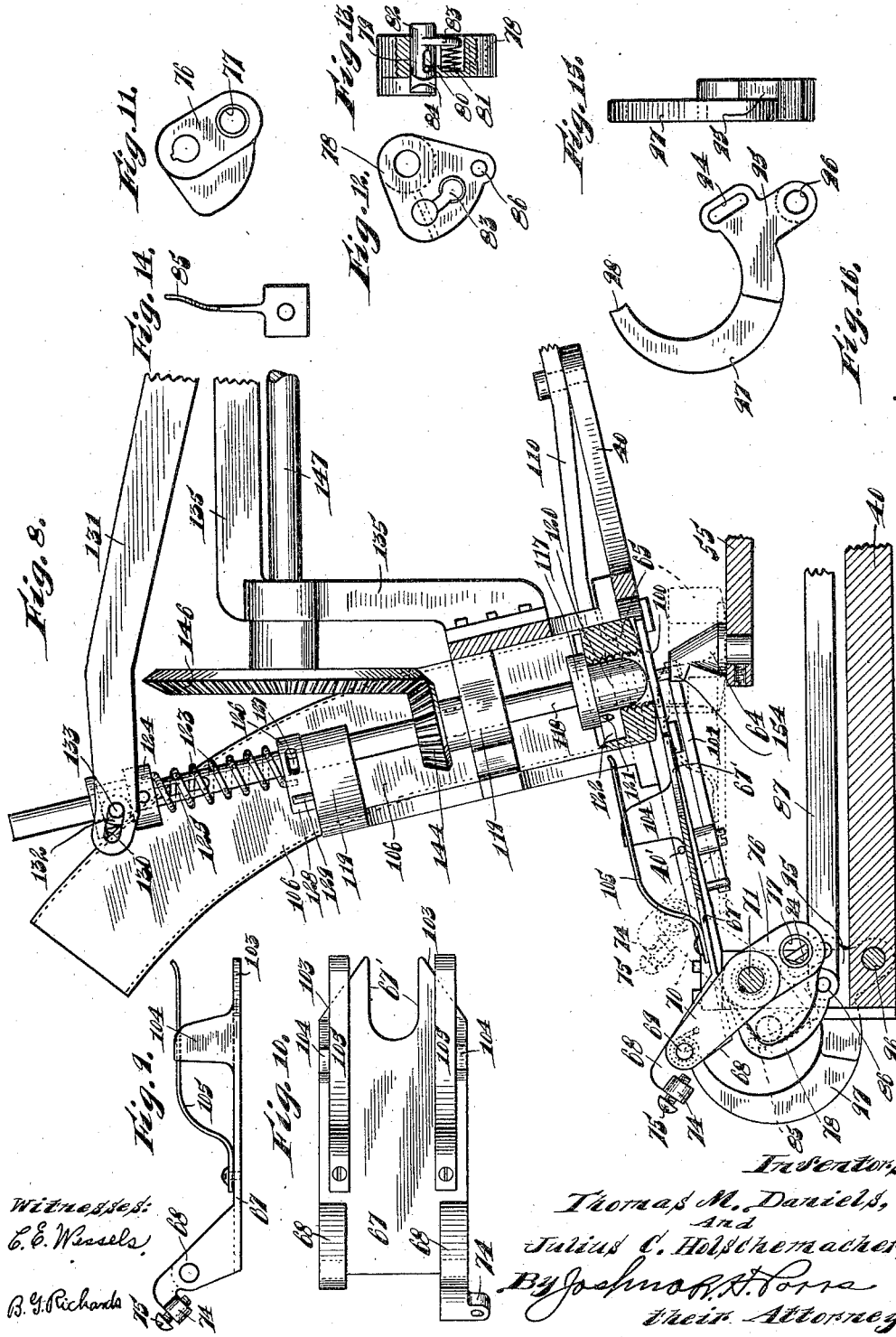

T. M. DANIELS & J. C. HOLSCHEMACHER.
LOCK NUT MAKING MACHINE.
APPLICATION FILED MAR. 6, 1915.
1,180,016.
Patented Apr. 18, 1916.
14 SHEETS—SHEET 9.
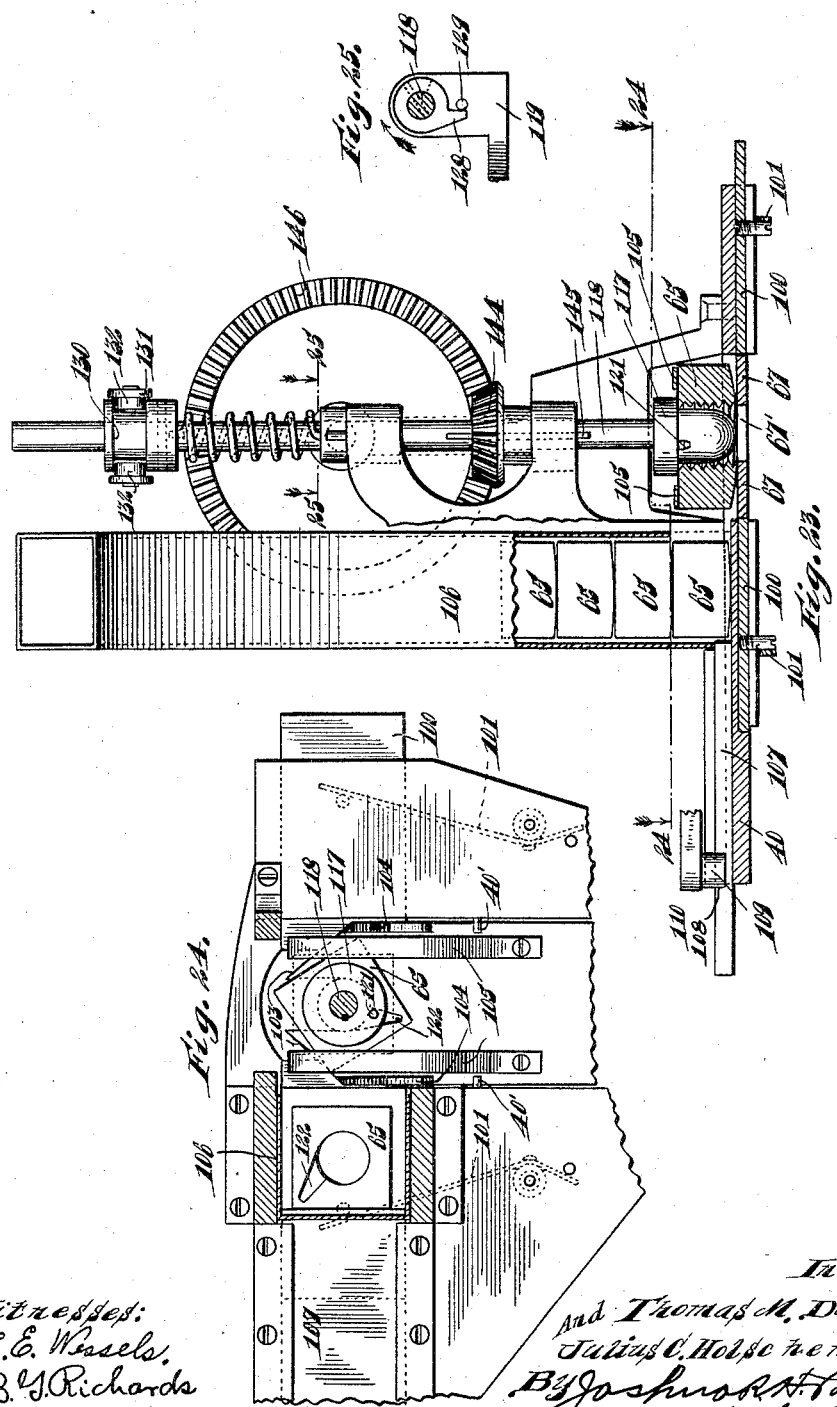

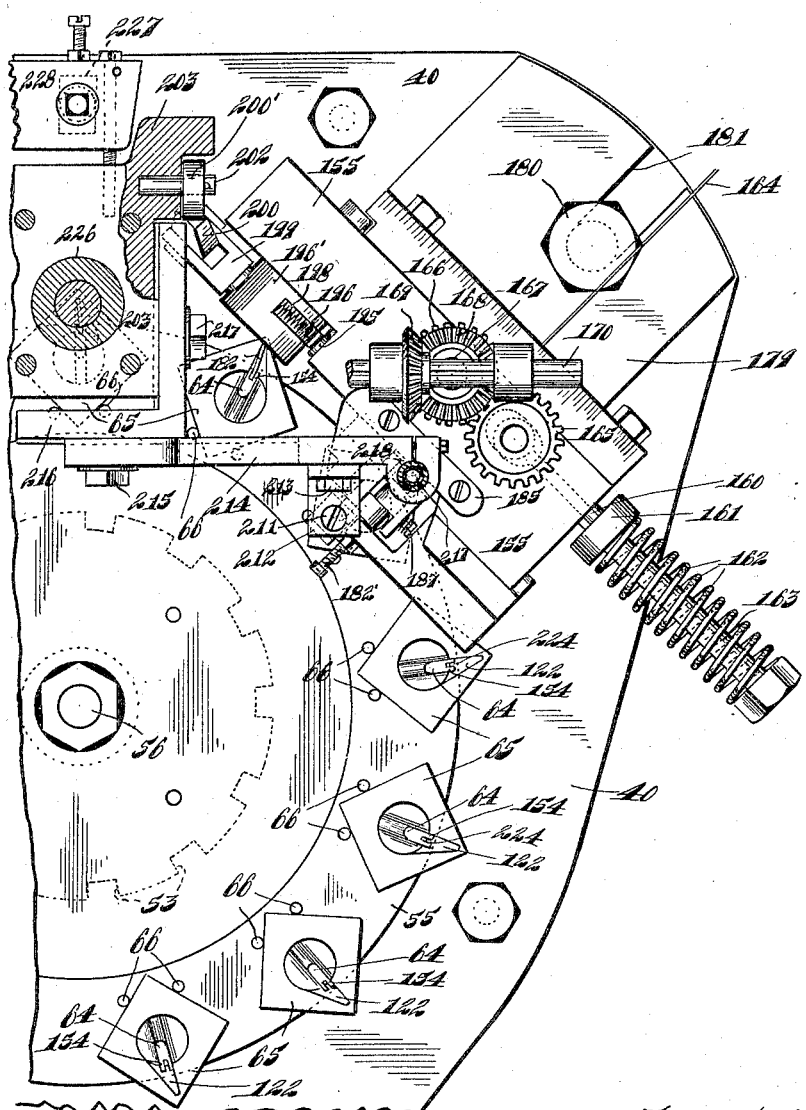

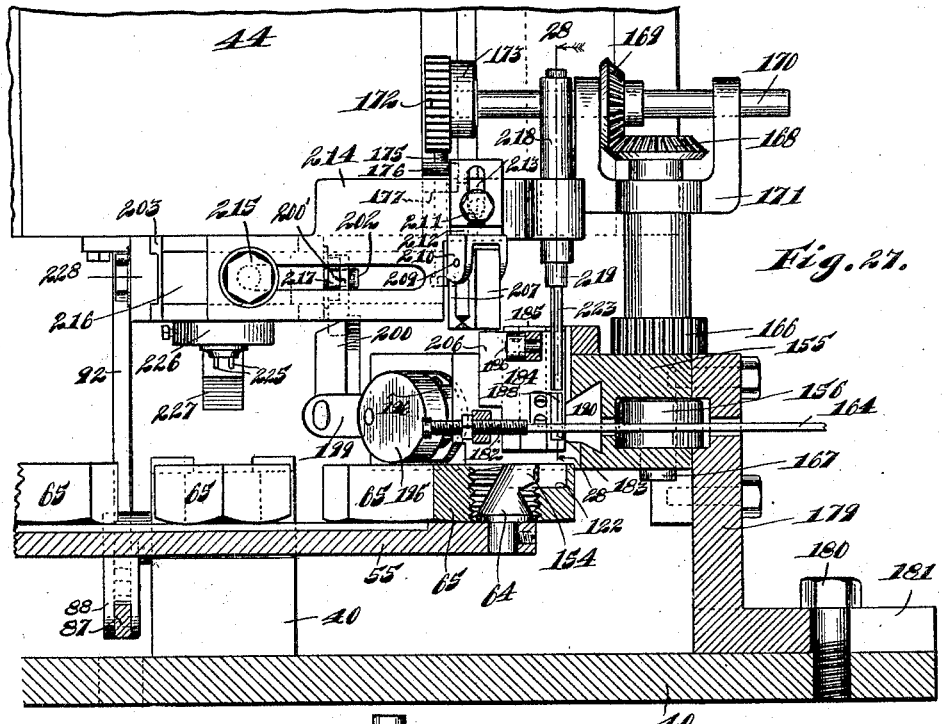
Fig. 27.
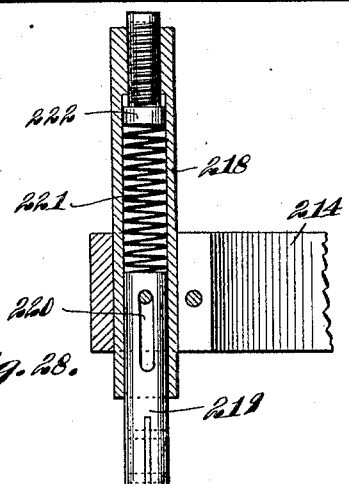
Fig. 28.
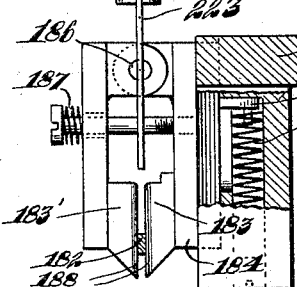

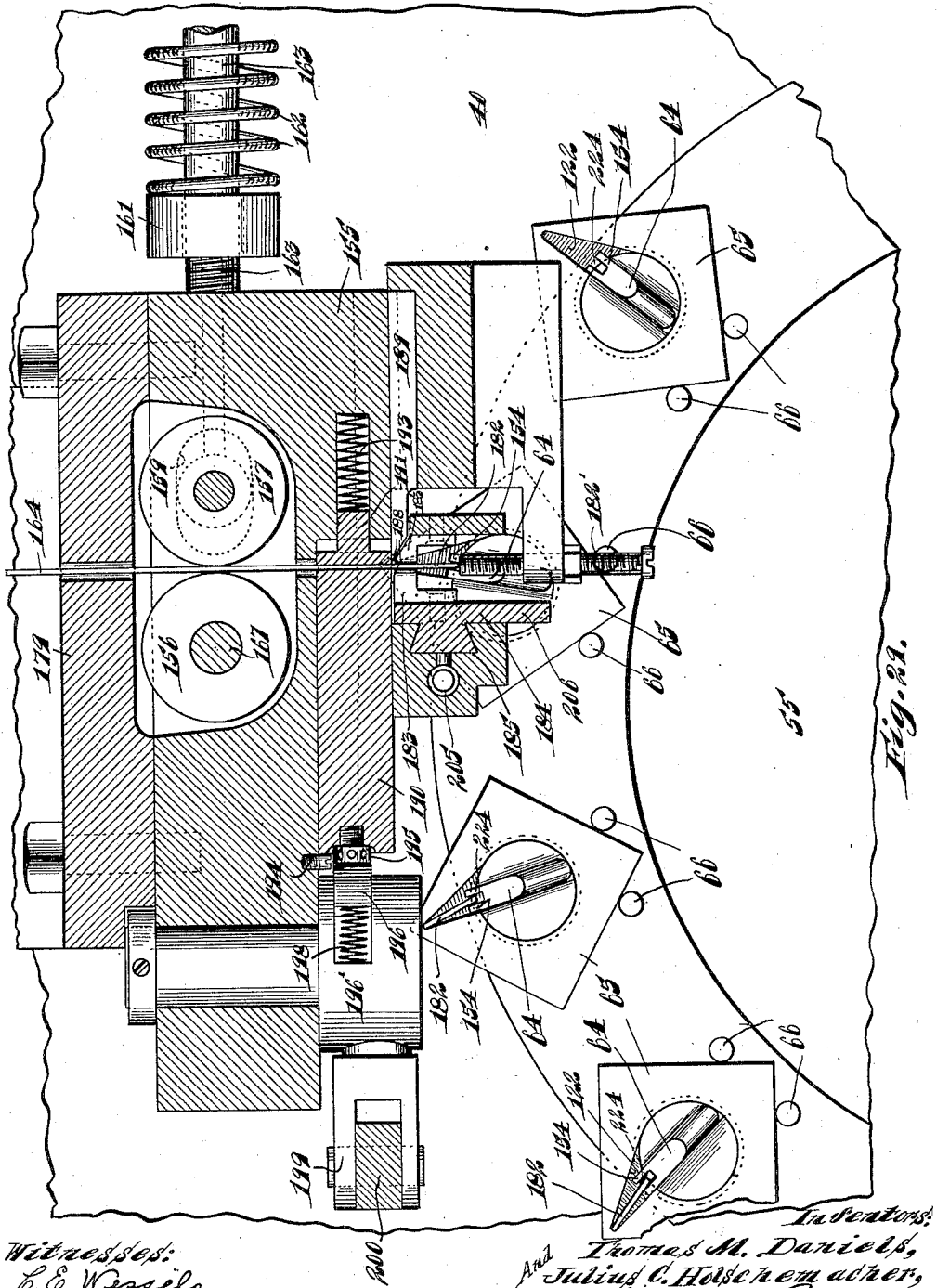

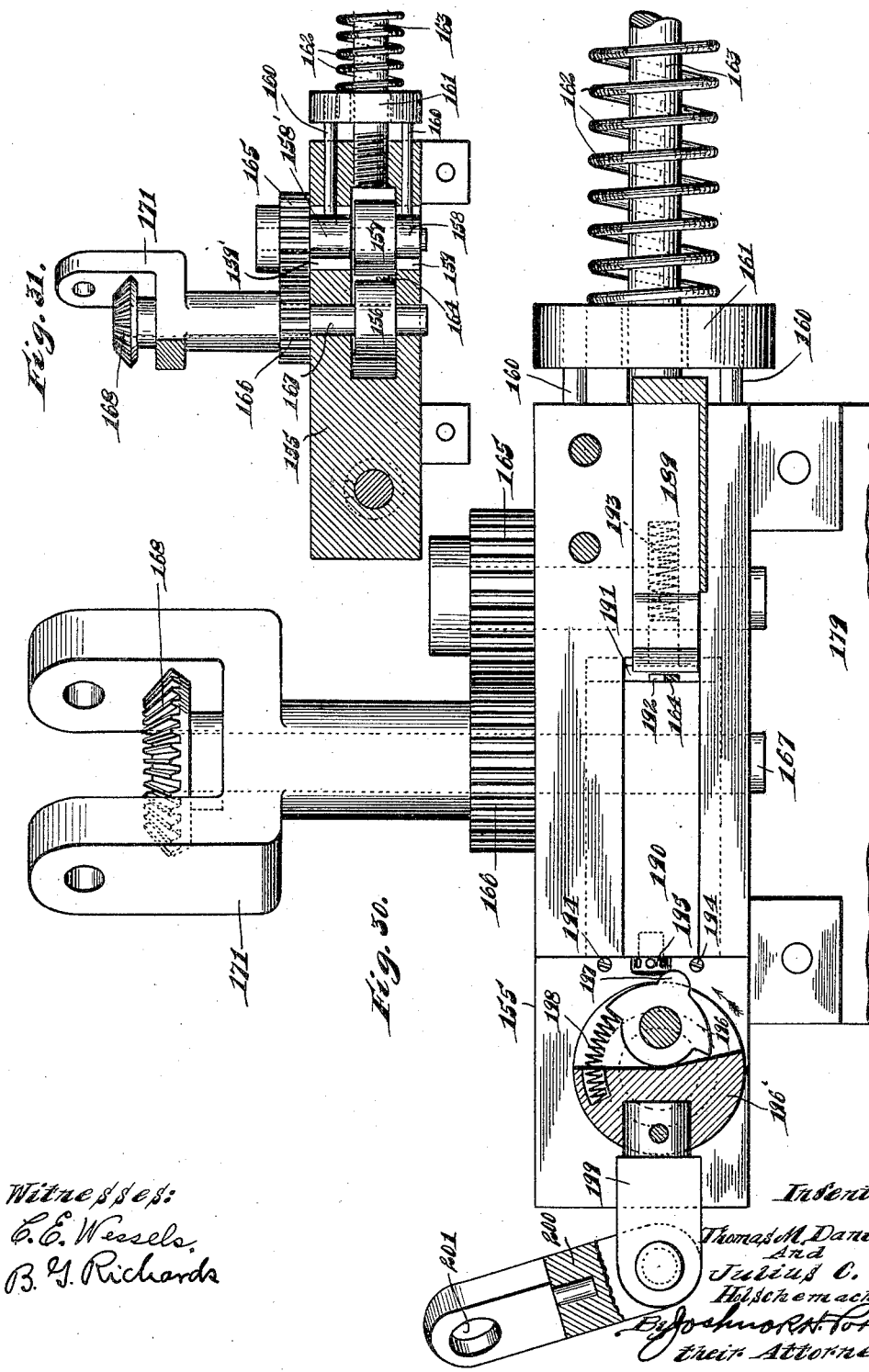

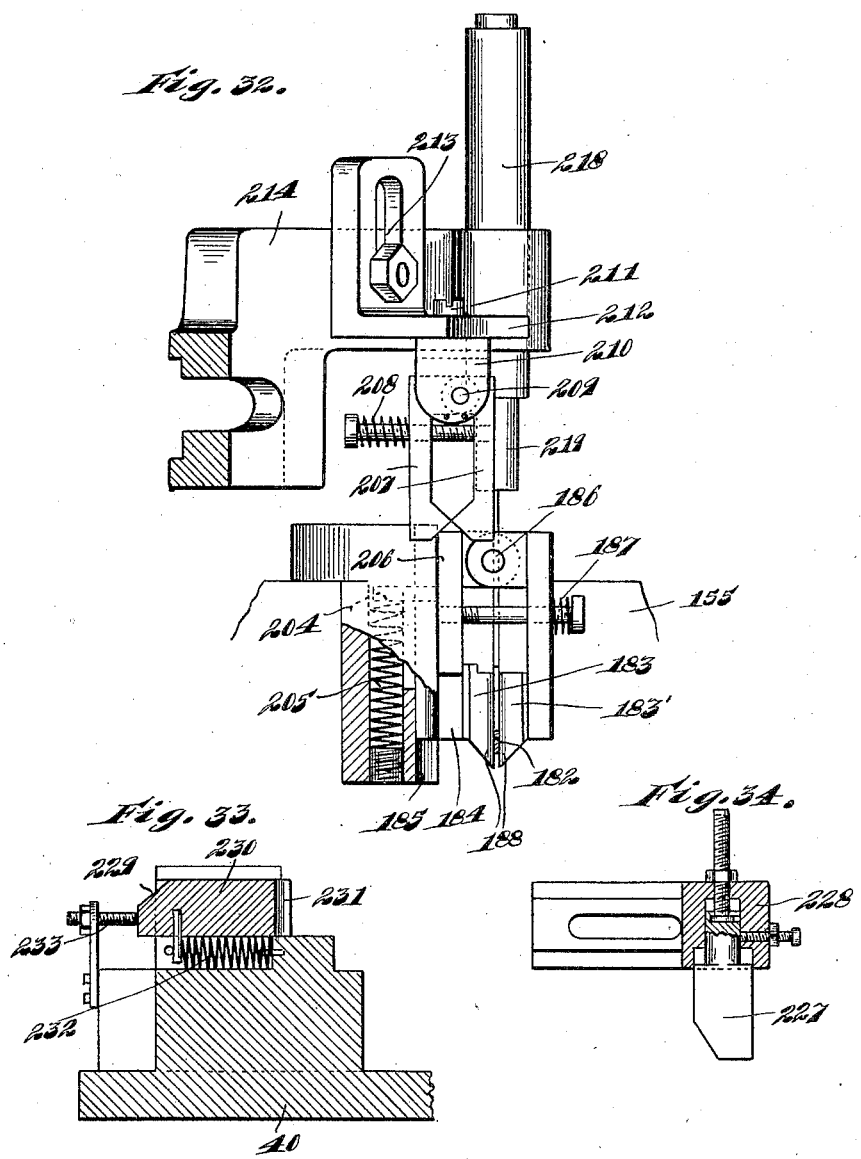

UNITED STATES PATENT OFFICE.

THOMAS M. DANIELS AND JULIUS C. HOLSCHEMACHER, OF CHICAGO, ILLINOIS, ASSIGNORS TO DANIELS SAFETY DEVICE COMPANY, OF CHICAGO, ILLINOIS, A CORPORATION OF ILLINOIS.

LOCK-NUT-MAKING MACHINE.

1,180,016.      Specification of Letters Patent.      Patented Apr. 18, 1916.

Application filed March 6, 1915. Serial No. 12,641.

*To all whom it may concern:*

Be it known that we, THOMAS M. DANIELS and JULIUS C. HOLSCHEMACHER, citizens of the United States, and residents of the city of Chicago, county of Cook, and State of Illinois, have invented certain new and useful Improvements in Lock-Nut-Making Machines, of which the following is a specification.

Our invention relates to improvements in lock nut making machines and more especially to machines for manufacturing self-locking nuts, the object of the invention being the provision of a machine of this character which will manufacture the nuts automatically and with great economy.

The invention consists in the combinations and arrangements of parts hereinafter described and claimed.

The invention will be best understood by reference to the accompanying drawings forming a part of this specification, and in which, Figure 1 is a partial side elevation of a machine embodying our invention, Fig. 2, a front view of the same with portions broken away and other portions shown in section, Fig. 3, an enlarged partial top plan view of the machine with portions removed and others shown in section, Fig. 4, an enlarged side elevation of a portion of the machine, Fig. 5, a bottom plan view of a feeding plate and associated elements employed in the machine, Fig. 6, a side view corresponding to Fig. 5, Fig. 7, an enlarged side view of a portion of the machine, Fig. 8, a sectional view taken through mechanism employed for feeding nuts to the machine, Fig. 9, a side view of a feeding platform employed in the construction, Fig. 10, a top view corresponding to Fig. 9, Fig. 11, a side view of an oscillatory arm employed in the construction, Fig. 12, a side view of an oscillatory arm employed in the construction and coöperating with the arm illustrated in Fig. 11, Fig. 13, an end view corresponding with Fig. 12 with portions broken away for the sake of clearness, Fig. 14, a detail of a cam member coöperating with the members illustrated in Figs. 11, 12 and 13, Fig. 15, an end view of an oscillatory arm employed in the construction, Fig. 16, a side view corresponding to Fig. 15, Fig. 17, a detail elevation of a portion of the nut feeding mechanism, Fig. 18, a face view of a cam member employed in the construction, Fig. 19, a section taken on line 19—19 of Fig. 18, Fig. 20, a detail view of mechanism employed for positioning the nuts to be fed into the machine, Fig. 21, a detail view of a pawl and ratchet mechanism employed in the machine, Fig. 22, a section taken on line 22—22 of Fig. 21, Fig. 23, a detail view of a positioning head and its coöperating parts employed in the construction, Fig. 24, a section taken on line 24—24 of Fig. 23, Fig. 25, a section taken on line 25—25 of Fig. 23, Fig. 26, a detail plan view of mechanism employed for feeding a steel strip into the machine and coöperating parts, Fig. 27, a detail vertical section of said mechanism, Fig. 28, an enlarged vertical section taken on line 28—28 of Fig. 27, Fig. 29, an enlarged horizontal section through the strip feeding mechanism, Fig. 30, a detail view illustrating mechanism employed for severing the ends of said strip, Fig. 31, a detail view of the feed rollers for said strip, Fig. 32, another detail view of said feeding mechanism, Fig. 33, a detail view of positioning mechanism employed in the machine, and Fig. 34, a detail view of a cam member employed in conjunction with said positioning mechanism.

The preferred form of construction, as illustrated in the accompanying drawings, comprises an ordinary punch press having a suitable supporting frame 40, and a horizontal driving shaft provided with an operating crank 41 driven through the agency of a driving pulley 42 and connected by means of a link 43 with the usual vertically reciprocating punch press head 44, as best illustrated in Figs. 1 and 2. These parts constitute an old and well known machine for the purpose and constitute no part of our present invention, except in so far as they coöperate with the mechanisms hereinafter set forth.

As best illustrated in Figs. 1 and 2, at one end the horizontal driving shaft of the punch press is provided with an adjustable crank pin 45 connected by means of a link 46 with a rocker arm 47 on a rocker shaft 48 suitably mounted on the frame 40 of the punch press. The rocker shaft 48 is provided with a rocker arm 49 having a slot and pin connection 50 with a slide bar 51 also mounted in the frame of the machine and carrying a spring held pawl 52 arranged to engage notches 53 in the periphery of a ratchet wheel 54 secured to the bottom of a feed plate or table 55 mounted to rotate horizontally on a stud shaft 56 positioned in the frame of the machine, as indicated in Figs. 1, 2, 3 and 5. A check pawl 57 is pivoted at 58 on the frame of the machine and equipped with a spring 59 for normally pressing the same into engagement with the notches 53 to prevent accidental movements of plate 55, as will be readily understood. Another pawl 61 is pivotally mounted at the end of slide bar 51 and is normally held in elevated position by means of a spring 62, as best shown in Figs. 5 and 6. Pawl 61 is provided with a lateral cam projection 63 coöperating with a cam projection 60 on pawl 57. The arrangement of the parts is such that upon rotation of the driving shaft of the punch press, slide bar 51 will be reciprocated to rotate the plate 55 intermittently. When said slide bar is moved from left to right, in the position indicated in Figs. 5 and 6, the cam projection 63 engages cam projection 60 operating the pawls 61 and 57 to permit of the passage of the pawl 61 without materially disturbing pawl 57. Upon reverse movement of said slide bar, the abrupt end of cam projection 63 engages cam projection 60 to force check pawl 57 out of engagement with ratchet wheel 54 whereupon said ratchet wheel and the plate 55 are rotated through an angle corresponding with the angular distance between the notches 53 in said ratchet wheel. After the first outward movement of pawl 57, cam projection 63 automatically releases cam projection 60, permitting pawl 57 to return to operative position riding upon the periphery of ratchet wheel 54 in position to engage the next notch 53 to lock the plate 55 in its advanced position. As explained above, the return movement of slide bar 51 is an idle one, so that rotation of the driving shaft of the punch press causes intermittent step by step feed of the plate 55, as will be readily understood.

As best illustrated in Figs. 1, 2, 3, 4, 5 and 6, the plate 55 is provided with a plurality of upstanding projections or pins 64 arranged thereon in the circumference of a circle having the axis of stud shaft 56 as a center and adapted to receive nuts 65 as indicated, holding pins 66 being arranged to engage the innermost corner of each nut and hold the same in definite position on each of said pins, as best illustrated in Fig. 3.

As best illustrated in Figs. 1, 3, 7, and 8 to 17 inclusive, the nuts 65 are automatically delivered to the pins 64 by means of an oscillatory feeding platform 67 having a notch 67' in its free edge adapted to pass over said pins, the feed mechanism for plate 54, above described, being such as to present the pins 64 successively in position to receive a nut from said platform at each operation thereof. The platform 67 is supported by means of two supporting arms 68 loosely mounted upon a shaft 69 mounted in oscillatory arms 70 fixed to an oscillatory shaft 71 having bearings in brackets 72 constituting a part of the frame of the machine. A helical spring 73 has one end secured to one of the oscillatory arms 68 and its other end secured to the shaft 69, said spring being normally under tension to maintain the platform 67 in elevated position and resting against the under sides of stop pins 40' on the frame of the machine, as best illustrated in Fig. 3. To further limit the upward swing of platform 67, a lug 74 is provided on one of the arms 68 and a set screw 75 arranged therein to contact with the corresponding arm 70 and thus limit upward swinging of said platform, as will be readily understood. An arm 76 is keyed to the shaft 71 and provided with a bushed opening 77, as indicated in Fig. 11. Another arm 78 is loosely mounted on shaft 71 adjacent arm 76 and carries a trigger pin 79 having a slot and pin connection 80 therewith. A spring 81 in arm 78 serves to normally hold the protruding end 82 of pin 79 in engagement with opening 77 in arm 76, yieldingly engaging an arm 83 on pin 79 for this purpose, as best illustrated in Figs. 12 and 13. The other end of pin 79 is provided with a cam notch 84 riding upon a stationary cam 85 secured to a stationary part of the machine, said cam 85 serving to withdraw the pin 79 from engagement with opening 77 upon oscillation of the arms 76 and 78, as best illustrated in Figs. 3 and 17. Arm 78 is connected by means of an opening 86 with a pivot pin on the end of a link 87 having the other end thereof connected with one arm 88 of a bell crank lever, the other arm 89 of which carries a roller 90 engaging a cam slot 91 in a cam plate 92 secured to the punch press head 44, as best illustrated in Figs. 3, 4 and 7. Link 87 also carries a pin 93 slidably engaging a slot 94 in an oscillatory lever 95 pivotally mounted at 96 on one of the brackets 72. Lever 95 is provided with an upwardly extending outwardly curved segmental arm 97 having its upper free end 98 bearing against one of the arms 68, as best shown in Figs. 3, 7, 8, 15 and 16.

The shaft 71 is extended at one end and carries a coiled spring 99 having one end secured to said shaft and the other end secured to the corresponding bracket 72, as best illustrated in Fig. 3, said spring being normally under tension to cause counter-clock-hand-wise rotation of said shaft 71. By this arrangement, it will be observed that at each downward movement of the punch press head, cam slot 91 will operate upon roller 90 to cause outward swinging of the arms 76 and 78 and of the upper end of the lever 97, the cam member 85 operating through this movement to gradually withdraw pin end 82 from engagement with opening 77 in arm 76. The arrangement is such, that this movement will cause downward swinging of platform 67 about the axis of shaft 71 as a center and the placing of a nut 65 resting upon said platform over the corresponding pin 64 on plate 55. However, when this has been accomplished, the cam member 85 is so timed as to withdraw the pin end 82 to release shaft 71, so that the action of spring 99 will cause outward oscillation of arm 70 until the end of arm 97 is encountered by the corresponding arm 68. This will cause withdrawal of platform 67 from under the nut on the corresponding pin on plate 55, thus automatically depositing said nut on said plate. Upon such outward oscillation of arm 70, the platform 57 rides upon the under sides of pins 40', spring 73 yielding for this purpose, so as to prevent immediate return of the platform to its original position. Upon the next upward movement of the punch head, the link 87 will be withdrawn and the parts returned to normal position, as will be readily understood.

As best shown in Figs. 3, 8, 23 and 24, two laterally slidable nut supporting plates 100 are suitably mounted in the frame of the machine on opposite sides of the platform 67, said plates being normally pressed together by means of leaf springs 101, as shown. The plates 100 are provided at their adjacent edges with inclined or beveled surfaces 102 coöperating with beveled surfaces 103 on the free end of the platform 67, so that when said platform is swung downwardly, as explained above, said plates will spring together to support a nut in place of said platform, and will be forced apart by the return movement of the platform so as to position the nut on the platform. This forcing apart of the plates 100 is effected by the wedging action of beveled surfaces 103 forcing themselves between surfaces 102 on said plates upon the return forward movement of platform 67, said plates yielding against the resistance of springs 101.

Platform 67 is provided with upstanding lugs 104 adapted to engage the adjacent edges of plates 100 during the initial downward movement of the platform 67 to prevent said plates from springing inwardly until after the nut on the platform has passed beyond danger of engagement thereby. Springs 105 are also provided on platform 67 and have their inner ends turned upwardly to automatically engage a nut as the platform 67 returns to normal position and hold said nut on said platform until deposited on the corresponding pin 64, as explained above.

An upwardly extending outwardly turned nut magazine 106 is arranged adjacent platform 67 and a feed plate 107 is arranged to reciprocate across the bottom of said magazine to force the bottommost nut out of said magazine onto the plates 100 during the operative movement of platform 67. At its outer end feed plate 107 is provided with a slot 108 engaging a roller 109 on one arm of a lever 110 pivotally mounted on the frame of the machine, as best illustrated in Fig. 3. The other end of lever 110 has a slot and ball connection 111 with one arm of a bell crank 112 pivotally mounted on the frame of the machine. The other end of bell crank 112 carries a roller 114 engaging a cam slot 115 in a cam plate 116 secured to the side of punch press head 44, as best illustrated in Figs. 3 and 4. By this arrangement, it will be observed that, the first part of the downward movement of the punch press head 44 will be an idle one as far as the bell crank 112 and the lever 110 are concerned, but that during the latter part of the downward movement and the early part of the upward movement, the bell crank 112 is oscillated to cause reciprocation of feed plate 107 to deliver a nut 65 from the magazine 106 onto the plates 100 and said feed plate withdrawn from engagement with said nut.

As best illustrated in Figs. 7, 8, and 23, a positioning head 117 is fixed to the lower end of a longitudinally movable shaft 118 arranged in a bracket 119 perpendicularly to the plane of the platform 67 when in normal position. The head 117 carries a central pivotal projection 120 adapted to enter the threaded opening in the nut 65 and with a positioning pin 121 adapted to enter a substantially U-shaped recess 122 in the upper side of a nut resting upon the plates 100. A helical spring 123 is arranged around the upper end of shaft 118, having one end secured to a collar 124 which is provided with a slot and pin connection 125 with shaft 118. The other end of spring 123 is secured to a collar 126 having a slot and pin connection 127 with shaft 118 and provided with a laterally extending arm 128 arranged to engage a stop pin 129 on bracket 119. The tension in spring 123 is such as to normally maintain the arm 128 resting against the stop pin 129, as shown in Fig. 25, and the arrangement is such that the shaft 118 may be yieldingly forced downwardly toward a nut resting upon plates 100 and may be rotated through a complete rotation and then brought to a stop. The nuts are positioned in the magazine 106 bottom-side up but without reference to the positions of the recesses 122 therein, so that each nut is fed from the magazines 106 with the recessed side up but the recess likely to occur in any one of four positions, as will be readily understood. The positioning head 117 is employed to position these nuts uniformly before being fed to the pins 64. By the arrangement specified, it will be observed that should the positioning head be thrown downwardly, the projection 120 will enter the threaded opening of the nut and pin 121 will either enter the recess 122 or ride on the upturned bottom surface of the nut, so that when said recess is encountered, the pin 121 will drop thereinto. Thus, the pin 121, during a complete rotation of the shaft 118, will engage the recess 122 in the corresponding nut and rotate the nut to the position indicated in Fig. 8, no matter in what position the nut may have been fed onto the plates 100.

As best illustrated in Figs. 1, 7, 8, and 23, means are provided for depressing the shaft 118 to effect engagement of positioning head 117 with the nut on plates 100. To effect this, the collar 124 is provided with an annular groove 130 and a lever 131 is bifurcated to embrace said collar and is provided with rollers 132 running in groove 130 and provided with trunnions 133 operating in slots in the end of lever 131. Lever 131 is pivotally mounted at 134 on a suitable bracket 135 constituting a portion of the frame of the machine, the other arm 136 of said lever being provided with a roller 137 running in a cam slot 138 in a cam plate 139 secured to the front of punch press head 44, as best shown in Figs. 4, 18 and 19. The roller 137 is provided with a plunger 140 adapted to run in an upwardly and inwardly inclined recess 141 arranged at the bottom of cam slot 138 and a vertical recess 142 arranged at the top of said cam slot. A vertical partition 143 divides the cam slot 138 into two vertical paths so as to cause the roller to pass to the right of said partition upon depression of the punch press head and to the left thereof upon elevation thereof, as indicated in Fig. 18. By this arrangement, upon depression of the punch press head, and consequently of cam plate 139, the plunger 140 engaging recess 141 will ride upwardly and inwardly in said recess causing depression of lever arm 136 and elevation of positioning head 117, such movement taking place slightly before and concurrently with the downward swing of platform 67 as explained above. As roller 137 passes behind partition 143, the plunger 140 rides out of recess 141 and said roller travels upwardly through the cam slot to the right of partition 143. Near the end of the downward stroke of the punch press head, the roller 137 is thrown outwardly and the plunger 140 enters the recess 142, such outward movement of said roller causing depression of the positioning head 117 for engagement with a nut on the plates 100 feed thereto during elevation of said positioning head. Then, upon elevation of the punch press head, the plunger 140 riding in the recess 142 compels the passage of roller 137 to the left of partition 143 thus holding the positioning head in operative relation with the nut during the entire upward stroke of the punch press head.

As best shown in Figs. 1, 7, 8, 20 and 23, a bevel gear 144 is splined or feathered on shaft 118 by means of a slot 145 cut in said shaft and a corresponding key in said gear, as will be readily understood. Bevel gear 144 meshes with a crown bevel gear 146 secured to a shaft 147 mounted in bracket 135 and carrying a ratchet 148 coöperating with a pawl arm 149 loosely mounted on said shaft and provided with a pawl 150 engaging said ratchet as best shown in Fig. 20, the parts in this figure being illustrated in full lines with the punch press head elevated, and in dotted lines with the punch press head depressed. Pawl arm 149 carries a roller 151 operating in a cam slot 152 in a cam plate 153 secured to the outer face of punch press head 44. This arrangement is such that upon depression of the punch press head 44, the roller 151 at first rides idly in cam slot 152, but near the end of said downward stroke, the upper edge of the cam slot engages said roller and depresses the same, as indicated in Fig. 20. This moves the pawl 150 rearwardly of the ratchet 148 to engage the next tooth therein. The first part of the upward movement of the punch press head is also an idle movement until the lower edge of the cam slot 152 engages the roller 151, thus causing rotation of the shaft 147 through a quarter of a revolution during the time in which the positioning head 117 is depressed into engagement with the nut on plates 100, as explained above, to cause positioning of the nuts uniformly on said plates irrespective of the positions in which they are fed thereto, so as to bring the recess 122 in each of said nuts in position to register with and pass over a lateral projection 154 provided on each of the pins 64, as best shown in Figs. 1, 3, 4, 24, 26 and 29.

After each nut is positioned on the pin 64, temporarily stationed under platform 67, the plate 55 moves on to carry said nut through the remainder of the machine in which it is next presented to mechanism for inserting a locking pawl or dog therein for automatically locking the nut on its bolt against removal. This mechanism is best illustrated in Figs. 7, 26, 27, 28, 29, 30, 31 and 32, and comprises a block or head 155 adjustably mounted on the frame of the machine and carrying feed rollers 156 and 157, as best shown in Figs. 29 and 31. Roller 157 is provided with hubs 158 and 158' slidable in slots 159 and 159' in the block 155. Adjusting pins 160 are slidably mounted in said block to bear against said hubs and are connected by means of a yoke 161 yieldingly pressed toward said hubs by means of a compression spring 162 mounted on a stud 163. A strip of steel 164 is supplied to rollers 156 and 157 from a suitable roll or other supply not shown, and said rollers are operatively connected together by means of a gear 165 fixed to roller 157 and a gear 166 fixed to shaft 167 upon which gear 166 is fixed. Shaft 167 is driven through the medium of a bevel gear 168 meshing with a bevel gear 169 on a shaft 170 mounted in a suitable bracket 171 swiveled on shaft 167, as shown. Shaft 170 carries a ratchet 172 and a pawl arm 173 equipped with a spring held pawl 174 cooperating with said ratchet, as best illustrated in Figs. 21, 22 and 27. As best shown in Fig. 7 pawl arm 173 is set in the path of two set screws 175 mounted in the U-shaped yoke 176 slidable in brackets 177, secured to the side of punch press head 44 and provided with slots 178 permitting of adjustments of said set screws and said yoke, as will be readily understood. The block 155 is provided with a flange 179 which in turn is adjustably secured to the frame 40 of the machine by means of a bolt 180 operating in a slot 181. By this arrangement it will be observed that adjustments of the block 155 may be readily made for accommodating different sizes of nuts. The arrangement is such that at each movement of the plate 55, a new nut is presented and the strip end 182 is fed out into juxtaposition with said nut, the parts permitting delicate adjustments to effect this.

A pair of jaws 183 and 183' are arranged to receive the protruding end 182 of strip 164, as the same is fed outwardly by means of rollers 156 and 157, said jaws having their corresponding edges 188, as best shown in Fig. 29, rounded to facilitate insertion of strip end 182 therebetween. A set screw 182' is provided to furnish a stop for the end of said strip to insure proper positioning thereof between jaws 183 and 183'. Jaw 183 is fixed to a vertically slidable block 184 dovetailed in a block 185 secured to the outer face of block 155. As best shown in Fig. 32, jaw 183' is pivotally connected at 186 with block 184 and is provided with a spring 187 normally pressing said jaw 183' toward jaw 183 to yieldingly engage and hold the strip end 182. A cutting blade 189 is fixed in block 155 and coöperates with a reciprocating carrier 190 to which is secured a head 191 provided with a notch 192 arranged to permit the passage of strip 164 therethrough, as best shown in Fig. 30, said head 191 being normally pressed against carrier 190 and said carrier 190 being normally held in the position shown in Fig. 29 against stop screw 194 by means of a spring 193 in block 155. The arrangement is such that reciprocation of carrier 190 carries the strip 164 across the edge of knife blade 189 severing the protruding end of said strip resting between jaws 183 and 183'. Carrier 190 carries a contact head 195 coöperating with a rocker cam 196 mounted in a rocker head 196' and carrying a cam projection 197 contacting with head 195, as best shown in Figs. 29 and 30. A spring 198 normally holds the rocker cam 196 in the position indicated in Fig. 30 and rocker head 196' is provided with a rocker arm 199 connected by a link 200—201 with a pin 202 secured to a block 203 arranged on the bottom of punch press head 44, as best indicated in Figs. 7 and 30, the link portions 200 and 201 being swiveled together to permit of the operation of the punch press head to cause oscillation of rocker head 196' and consequently operation of rocker cam 196 to reciprocate carrier 190 to sever the end 182 of the steel strip 164. As stated above, the severed end of the steel strip will be engaged and supported by the jaws 183 and 183' mounted upon block 184. Block 184 is normally held in elevated position by means of a pin 204 resting upon the top of a compression spring 205, as best shown in Fig. 32. Block 184 is provided with a lateral projection or flange 206 coöperating with jaws 207 normally held together by means of a spring 208 and pivotally mounted at 209 in a bracket 210 swiveled at 211 on an adjustable angle member 212 adjustably secured at 213 to a block 214. Block 214 is adjustably secured by means of a bolt and slot connection 215 to an angle member 216 in turn adjustably secured to the side of block 203 by means of a bolt and slot connection 217, as best illustrated in Figs. 26 and 32. As best shown in Figs. 28 and 32, a guide head 218 is mounted in block 214 and carries a plunger 219 having a slot and pin connection 220 therewith, said plunger being normally held in depressed position by means of a compression spring 221. bearing against its upper end and against an adjusting screw 222 in head 218. Plunger 219 is provided with a blade 223 arranged to enter between jaws 183 and 183' to force the severed strip end 182 downwardly from jaws 183 and 183' into the recess 122 in the corresponding nut 65, the lateral projection 154 on each of the pins 64 being also provided with a notch 224 to receive said severed strip end and hold the same in proper position in said recess. However, before this motion takes place, the jaws 183 and 183' are first lowered by the action of jaws 207 on flange 206 until their lowered beveled ends project into said recess in which position they rest until blade 223 serves to release the severed strip end 182, jaws 207 opening and sliding upon flange 206 during such movement. The spring 221 also permits of lost motion in blade 223 to facilitate this action in different sizes of nuts. Upon upward movement of the punch press head, the jaws 207 frictionally engaging flange 206, tend to elevate the same, such action being assisted by the action of spring 205, the parts being thus restored to normal position for the reception of a new strip end, and the action of the parts being so timed as to result in the proper insertion of a strip end in each nut as it rests temporarily in juxtaposition to the strip end.

Plunger pins 225 are arranged adjacent each other and are secured to a plunger head 226 mounted upon the under side of block 203 and arranged to impinge upon each of the nuts in turn on opposite sides of the locking pawl 182 simultaneously to simultaneously upset the metal of said nut over the upper edge of each pawl to secure the same in position in the nut. To facilitate this operation a vertically adjustable positioning cam 227 is adjustably secured in an angle block 228 adjustable on block 203 in position to engage the bevel cam surface 229 on a positioning block 230 having a U-shaped recess 231 therein adapted to engage a corner of a nut and hold the same in correct position during the punching process. Block 230 is normally held in retracted position by means of a compression spring 232 and the retracted position is rendered adjustable by means of a set screw 233 as shown in Fig. 33. By this arrangement, it will be observed that at each stroke of the punch press head to upset the metal of the nut as explained above, the positioning block 230 will be forced out into engagement with a corner of the nut to hold the same correctly in position while said upsetting action is taking place.

A curved stationary cam member 234 is secured to the frame of the machine and arranged in the path of the nuts on pins 64 so as to pass between said nuts and the plate 55 to automatically discharge said nuts from said plate and pins, as will be readily understood.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. In a machine of the class described, the combination of a nut carrier; means for positioning a locking member in a nut thereon; and means for securing said locking member in said nut, substantially as described.

2. In a machine of the class described, the combination of a nut carrier; means for positioning a locking member in a nut thereon; and means for upsetting the material of said nut to secure said locking member therein, substantially as described.

3. In a machine of the class described, the combination of a nut carrier consisting of an intermittently rotating plate; upstanding pins on said plate; means for positioning locking members in nuts on said pins during the pauses in said rotation; and means for securing said locking members in said nuts during the pauses in said rotation, substantially as described.

4. In a machine of the class described, the combination of a nut carrier consisting of an intermittently rotating plate; upstanding pins on said plate; means for positioning locking members in nuts on said pins during the pauses in said rotation; and means for upsetting the material of said nut to secure said locking members therein during pauses in said rotation, substantially as described.

5. In a machine of the class described, the combination of a nut carrier; means for feeding a strip of material into juxtaposition to a nut thereon; means for severing a portion of said strip and positioning it in said nut; and means for securing said severed portion in said nut, substantially as described.

6. In a machine of the class described, the combination of a nut carrier; means for feeding a strip of material into juxtaposition to a nut thereon; means for severing a portion of said strip and positioning it in said nut; and means for upsetting the material of said nut to secure said severed portion therein, substantially as described.

7. In a machine of the class described, the combination of a nut carrier consisting of an intermittently rotating plate; upstanding pins on said plate; means for feeding a strip of material into juxtaposition to nuts on said pins; means for severing portions of said strip and positioning them in said nuts during pauses in said rotation; and means for securing said severed portions in said nuts during pauses in said rotation, substantially as described.

8. In a machine of the class described, the combination of a nut carrier consisting of an intermittently rotating plate; upstanding pins on said plate; means for feeding a strip of material into juxtaposition to nuts on said pins; means for severing portions of said strip and positioning them in said nuts during pauses in said rotation; and means for upsetting the material of said nuts to secure said severed portions therein during pauses in said rotation, substantially as described.

9. In a machine of the class described, the combination of a nut carrier; means for feeding a strip of material into juxtaposition to a nut thereon; means for severing a portion of said strip and positioning it in said nut; and means for upsetting the material of said nut simultaneously over the sides of the outer edge of said severed portion to secure the same in place, substantially as described.

10. In a machine of the class described, the combination of a nut carrier consisting of an intermittently rotating plate; upstanding pins on said plate; means for feeding a strip of material into juxtaposition to nuts on said pins; means for severing portions of said strip and positioning them in said nuts during pauses in said rotation; and means for upsetting the material of said nuts simultaneously over the sides of the outer edges of said severed portions during the pauses in said rotation, substantially as described.

11. In a machine of the class described, the combination of a nut carrier; nuts formed to receive locking members; means for positioning said nuts uniformly and feeding them onto said carrier; means for positioning locking members in nuts on said carrier; and means for securing said locking members in said nuts, substantially as described.

12. In a machine of the class described, the combination of a vertically reciprocating member; a rotatable plate; operative means for rotating the latter intermittently; nut holding means on said plate; and punching means on said reciprocating member arranged to upset the material of nuts to secure locking members therein, substantially as described.

13. In a machine of the class described, the combination of a horizontal driving shaft; a vertically reciprocating member operatively connected with said shaft; a rotatable plate; an operative connection between said shaft and plate for rotating the latter intermittently; nut holding means on said plate; and punch means on said reciprocating member arranged to upset the material of nuts to secure locking members therein, substantially as described.

14. In a machine of the class described, the combination of a horizontal driving shaft; a vertically reciprocating member operatively connected with said driving shaft; a rocker shaft operatively connected with said horizontal shaft; a slide bar operatively connected with said rocker shaft; a rotatable plate; a pawl and ratchet connection between said slide bar and said plate; pins on said plate; and punch means on said reciprocating member arranged to upset the material of nuts on said pins to secure locking members therein, substantially as described.

15. In a machine of the class described, a nut carrier comprising a substantially horizontal rotatable plate; a plurality of pins thereon; and means on said plate coöperating with said pins to hold nuts thereon, substantially as described.

16. In a machine of the class described, a nut carrier comprising a substantially horizontal rotatable plate; a plurality of pins thereon; and means on said plate adapted to engage corners of nuts on said pins and coöperating with said pins to hold nuts thereon, substantially as described.

17. In a machine of the class described, a nut carrier; a downwardly movable and laterally withdrawable nut support arranged to deposit nuts on said carrier; and means for moving said support downwardly and withdrawing it to deposit nuts on said carrier, substantially as described.

18. In a machine of the class described, a nut carrier; a downwardly swinging and laterally withdrawable nut support arranged to deposit nuts on said carrier; and means for swinging said support downwardly and withdrawing it to deposit nuts on said carrier, substantially as described.

19. In a machine of the class described, a nut carrier comprising a substantially horizontal rotatable plate; a plurality of pins thereon; a downwardly movable and laterally withdrawable nut support arranged to deposit nuts on said pins; and means for moving said support downwardly and withdrawing it to deposit nuts on said pins, substantially as described.

20. In a machine of the class described, a nut carrier comprising a substantially horizontal rotatable plate; a plurality of pins thereon; a downwardly swinging and laterally withdrawable nut support arranged to deposit nuts on said pins; and means for swinging said support downwardly and withdrawing it to deposit nuts on said pins, substantially as described.

21. In a machine of the class described, a nut carrier comprising a rotatable plate; a plurality of pins thereon; a downwardly swinging and laterally withdrawable nut support arranged to deposit nuts on said pins; means for swinging said support downwardly and withdrawing it to deposit nuts on said pins; and means for feeding nuts onto and uniformly positioning said nuts on said support, substantially as described.

22. In a machine of the class described, a nut positioning device movable to engage a nut and rotatable to position the same; and yieldable means for so moving said device and effecting rotation thereof, substantially as described.

23. In a machine of the class described, a nut positioning device provided with a projection and movable to effect engagement of said projection with a recess in a nut and rotatable to position the nut; and yielding means for so moving said device and effecting rotation thereof, substantially as described.

24. In a machine of the class described, a nut positioning device movable to engage a nut and rotatable to position the same, said device being provided with a projection to enter the threaded opening of a nut and constituting a pivot therefor; and yielding means for so moving said device and effecting rotation thereof, substantially as described.

25. In a machine of the class described, a nut positioning device provided with a projection and movable to effect engagement of said projection with a recess in a nut and rotatable to position said nut, said device being also provided with a projection to enter the threaded opening of a nut and constitute a pivot therefor; and yielding means for so moving said device and effecting rotation thereof, substantially as described.

26. In a machine of the class described, a nut carrier; a downwardly movable and laterally withdrawable nut support arranged to deposit nuts on said carrier; means for moving said support downwardly and withdrawing it to deposit nuts on said carrier; means for feeding nuts onto said support; a nut positioning device movable to engage a nut on said support and rotatable to position the same; and yielding means for moving said device and effecting rotation thereof, substantially as described.

27. In a machine of the class described, a locking member supplying device comprising means for intermittently feeding a strip of material; spring held clamping and guiding jaws arranged to receive the end of said strip; means for severing said strip end; means for moving said jaws into position to guide said severed end into a nut; and means for forcing said severed end from said jaws into said nut, substantially as described.

28. In a machine of the class described, a nut carrier; means for feeding a strip of material into juxtaposition to a nut on said carrier; spring held jaws arranged to receive the end of said strip; means for severing said strip end; and means for forcing said severed end from said jaws into a nut, substantially as described.

29. In a machine of the class described, a nut carrier; means for feeding a strip of material into juxtaposition to a nut on said carrier; spring held clamping and guiding jaws arranged to receive the end of said strip; means for severing said strip end; means for moving said jaws into position to guide said severed end into a nut; and means for forcing said severed end from said jaws into said nut, substantially as described.

30. In a machine of the class described, a securing means comprising adjacent punch members arranged to contact with a nut and simultaneously upset the material thereof over opposite sides of a locking member therein, substantially as described.

31. In a machine of the class described, a rotatable plate; nut carrying pins on said plate; and a curved stationary cam arranged to engage carried nuts and discharge the same from said pins, substantially as described.

32. In a machine of the class described, the combination of a horizontal driving shaft; a vertically reciprocating member operatively connected with said driving shaft; a rocker shaft operatively connected with said horizontal shaft; a slide bar operatively connected with said rocker shaft; a rotatable plate; a pawl and ratchet connection between said slide bar and said plate; pins on said plate; means on said plate adapted to engage corners of nuts on said pins and coöperating with said pins to hold nuts thereon; a downwardly swinging and laterally withdrawable slotted nut support arranged to deposit nuts on said pins; means for swinging said support downwardly and withdrawing it to deposit nuts on said pins; means for feeding nuts onto said support; a nut positioning device provided with a projection and movable to effect engagement of said projection with a recess in a nut on said support and rotatable to position the same, said device being provided with a projection to enter the threaded opening of a nut and constitute a pivot therefor; yielding means for so moving said device and effecting rotation thereof; means for feeding a strip of material into juxtaposition to nuts on said pins; spring held clamping and guiding jaws arranged to receive the end of said strip; means for severing said strip end; means for moving said jaws into position to guide severed strip ends into nuts on said pins; means for forcing said severed strip ends from said jaws into said nuts;

securing means comprising adjacent punch members arranged to contact with a nut and simultaneously upset the material thereof over opposite sides of said severed ends; and a curved stationary cam arranged to contact with the under sides of nuts on said pins, raise said nuts from engagement with said pins and discharge them, substantially as described.

In testimony whereof we have signed our names to this specification in the presence of two subscribing witnesses.

THOMAS M. DANIELS.
JULIUS C. HOLSCHEMACHER.

Witnesses:
JOSHUA R. H. POTTS,
ARTHUR A. OLSON.

Copies of this patent may be obtained for five cents each, by addressing the "Commissioner of Patents, Washington, D. C."